Feb. 14, 1961 R. E. KENNEMER ET AL 2,971,802
GROOVED CYLINDER LINER FOR REDUCED RING GROOVE WEAR
Filed Oct. 2, 1958 2 Sheets-Sheet 1
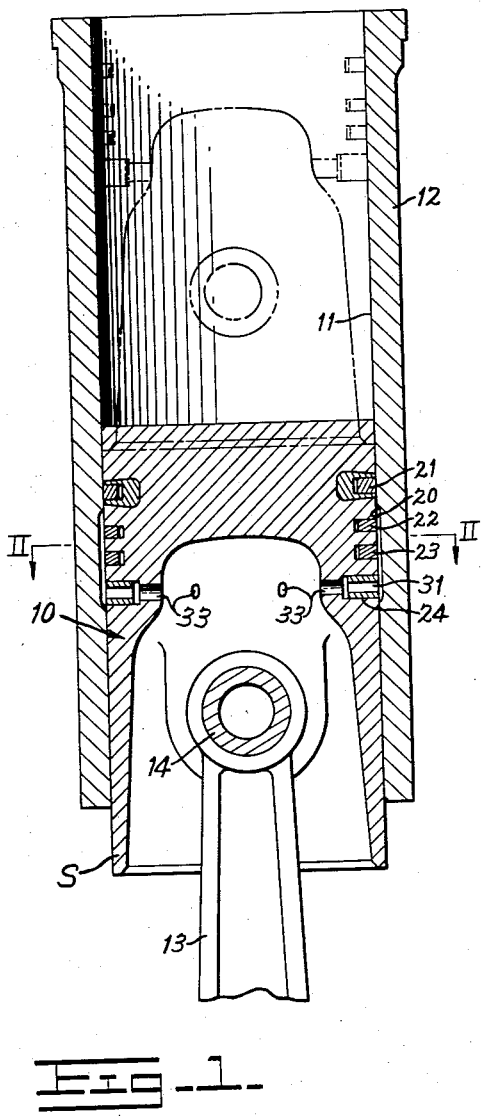
Fig-1-
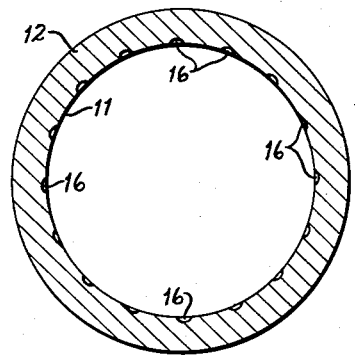
Fig-2-
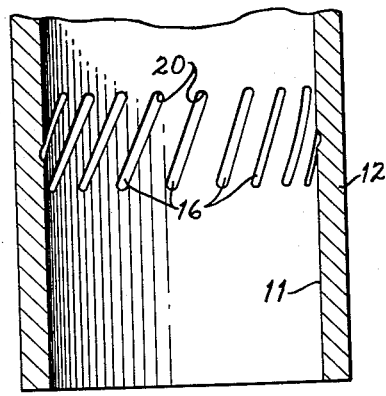
Fig-3-
INVENTORS
Robert E. Kennemer
John R. Immel
Robert B. Cambron
BY James S. Barton
Fryer and Johnson
ATTORNEYS

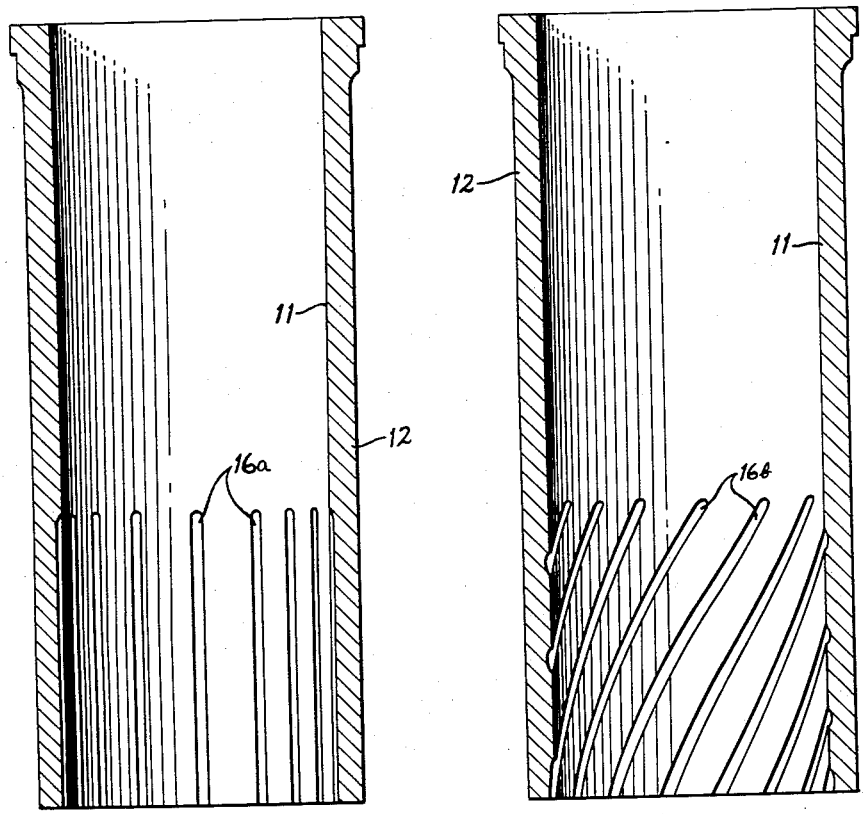
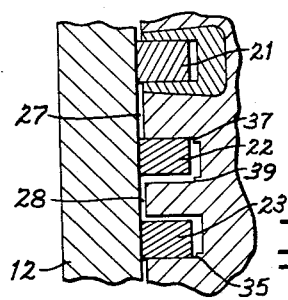
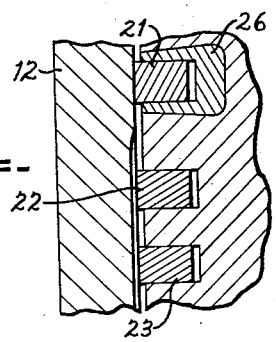

2,971,802
GROOVED CYLINDER LINER FOR REDUCED RING GROOVE WEAR

Robert E. Kennemer, Pekin, John A. Immel and Robert B. Cambron, Peoria, and James S. Barton, Morton, Ill., assignors to Caterpillar Tractor Co., Peoria, Ill., a corporation of California Filed Oct. 2, 1958, Ser. No. 764,887

5 Claims. (Cl. 309—2)

This invention relates to the correction of excessive ring groove wear in internal combustion engines whereby gas pressures are relieved from between the piston rings to prevent the rings from being forced against the sides of the grooves.

In engines as well as other devices such as compressors of the reciprocating piston type, piston rings are intended to form a seal between the pistons and cylinder walls. In a conventional engine piston and ring arrangement, a plurality of rings are disposed in grooves around the piston to seal the clearance space between the cylinder and the piston and to permit the piston to reciprocate freely. In mechanisms operating with high pressure such as in a high compression engine, gases present above the head of the piston attain such high pressures that, in continued operation, the gas enters under pressure into the areas between certain of the piston rings. Gases trapped between the piston rings cause them to be urged in opposite directions against the walls of the ring grooves. During the operation of a piston in a cylinder, any variance of the piston from the absolute center of the cylinder causes movement of the rings in their respective grooves. When the rings are forced against the side of the groove with sufficient pressure, wear takes place on the ring groove from such movement of the piston rings therein. Moreover, this ring groove wear is not uniform so that the side of the groove becomes out of plane and by continued operation of the piston in the cylinder causes breakage of the rings and eventual destruction of the mechanism.

It is the object of the present invention to provide a cylinder and reciprocating piston therein with means to prevent wear of the piston ring grooves by providing a means to vent the gas pressure normally trapped between the piston rings.

The invention is illustrated herein in connection with a cylinder liner; however, its adaptability to cylinders machined directly in an engine block will be readily understood.

In the drawings:

Fig. 1 is a central longitudinal sectional view of a piston and cylinder liner;

Fig. 2 is a section taken substantially along line II—II of Fig. 1 with the piston removed;

Fig. 3 is a fragmentary central longitudinal section of a cylinder embodying the invention;

Fig. 4 is an enlarged fragmentary sectional view of a portion of a cylinder and liner illustrating the invention;

Fig. 5 is an enlarged fragmentary section like Fig. 4 illustrating typical ring groove wear;

Fig. 6 is a central longitudinal sectional view of a cylinder illustrating a modification of the invention; and Fig. 7 is a similar view illustrating another modification of the invention.

In Fig. 1 of the drawings, a piston of the type used in internal combustion engines and the like is generally indicated at 10 and is shown as being disposed for reciprocatory motion within a cylinder bore 11 adapted to be contained within an engine block or as herein disclosed within a liner 12. A group of conventional expandable piston rings 21, 22, 23, and 24 are retained in suitable grooves in piston 10.

In a piston ring arrangement of this type, ring 21 is normally referred to as the compression ring; rings 22 and 23 are known as intermediate rings; while 24 is referred to as the oil control ring. It is common practice to provide in aluminum or light metal pistons, a hardened metal insert as illustrated 26 in which the groove for the compression ring 21 is formed in order to safeguard against wear of the piston at that point. This construction is not customarily employed for the other ring grooves because of the desirability of maintaining the piston as light as possible.

Piston 10 is reciprocated within bore 11 and is connected with the engine crankshaft, not shown, by a connecting rod 13 and wrist pin connection 14. Said pin 14 is journaled in a skirt portion S of piston 10 in a manner common ot devices of this type.

A plurality of circumferentially spaced grooves 16 are shown as being formed in the wall of cylinder bore 11 and are illustrated herein as being elongated recesses of generally semi-cylindrical cross section (see Fig. 2), the long axes of which extend longitudinally of the cylinder wall or at a slight angle as shown more clearly in Fig. 3.

Grooves 16 are so positioned that when the piston 10 is at a position corresponding to bottom dead center of the crankshaft, as seen in solid lines in Fig. 1, the top edges 20 of grooves 16 register with the piston preferably just below the compression ring 21. The length of grooves 16 is such that when the piston assumes the position shown, the grooves extend downwardly to a point just below the oil control ring 24 to provide vents for the escape of gases trapped between the intermediate rings and between the intermediate rings and the compression ring by way of a series of passages 31 in ring 24 and passages 33 in piston 10.

When no provision is made for venting gases trapped between the piston rings and engines are operated with high combustion pressures such as in supercharged engines, these gases gradually pass rings 21 and 22. After a period of operation, the space 27 (see Fig. 5) between rings 21 and 22, and a space between rings 22 and 23 indicated at 28 becomes charged with gas pressure. The lower side of ring 23 is not subject to gas pressure because the skeleton construction of the oil control ring 24 permits passage of gas through passages 33 provided in piston 10 adjacent ring 24. Pressure in space 28 urges ring 23 downward and, as hereinbefore stated, slight radial movement of the ring 23 during reciprocation of a piston causes the step wear on the side of the ring groove as indicated at 35. Since no pressure will have accumulated below ring 23, no wear takes place on the groove immediately above. At the same time ring 22 is forced upwardly by gas pressure in space 28 resulting in wear of the ring groove side wall indicated at 37 when no combustion gas is present above piston 10 such as on intake strokes of the engine. During periods of high pressure against the head of piston 10 such as during compression or power strokes, ring 22 will be forced to bear against the lower side of the ring groove by gas pressures in space 27 to effect wear indicated at 39.

A modification of gas vent grooves is shown in Fig. 6 as being continuous grooves 16a that extend to the bottom of cylinder bore 11 in direct communication with the crankcase of the engine, thereby providing a more liberal passage for venting of the gases from the space between the piston rings in the event there is a restriction of the passages 33 in the piston or 31 in oil ring 24. Likewise, a further modification of the gas vent groove is shown in Fig. 7 wherein continuous helical grooves 16b extend to the bottom of cylinder bore 11.

It is not intended to limit the configuration of the gas vent grooves provided in the cylinder; but when such grooves are provided at a slight helical angle as illustrated in Figs. 3 and 7, it has been found that the ring grooves of the piston are kept relatively free of solid deposits whereas the straight grooves illustrated in Fig. 6 produce only spots in the piston adjacent grooves 16a which are relatively free of deposits. In addition, the helical grooves disclosed at 16 and 16b are particularly beneficial in order that the gap of each ring moving in a straight line along the cylinder wall will cross the vent groove rather than register with it throughout the entire piston stroke.

We claim:

1. In combination with a cylinder having a reciprocating piston therein wherein the piston has circumscribing grooves and expansible rings to form a seal against leakage of pressure from the head end of the piston, the improvement which comprises said cylinder having grooves in its inner wall which register with all of said rings when the piston is in bottom dead center position except the ring nearest the head end of the piston to relieve pressure trapped in the ring area without relieving pressure from the head end.

2. In combination with a cylinder having a reciprocating piston therein wherein the piston has circumscribing grooves and expansible rings to form a seal against leakage of pressure from the head end of the piston, the improvement which comprises said cylinder having grooves in its wall which register with some of said rings when the piston is in bottom dead center position to relieve pressure trapped in the ring area, and vent means in one of said rings and extending through the piston wall in the groove which retains said one ring to permit escape of said pressure.

3. In combination with a cylinder and a reciprocating grooved piston therein wherein the piston has circumscribing and expansible rings in the grooves comprising a compression ring adjacent the head end of the cylinder, an oil control ring spaced therefrom toward the skirt end of the cylinder and intermediate rings therebetween, the improvement which comprises said cylinder having grooves in its wall extending longitudinally toward the head end of the piston to a position where they register with the intermediate rings and oil control ring when the piston is in bottom dead center position, and means to vent pressure from the ring area through said grooves.

4. In combination with a cylinder and a reciprocating grooved piston therein wherein the piston has circumscribing and expansible rings in the grooves comprising a compression ring adjacent the head end of the cylinder, an oil control ring spaced therefrom toward the skirt end of the cylinder, and intermediate rings therebetween, the improvement which comprises said cylinder having grooves in its wall extending longitudinally toward the head end of the piston to a position where they register with the intermediate rings and oil control ring when the piston is in bottom dead center position, and means to vent pressure from the ring area through said grooves comprising passages extending through the oil control ring and cylinder wall.

5. In combination with a cylinder and a reciprocating piston therein wherein the piston has circumscribing and expansible rings in the grooves comprising a compression ring adjacent the head end of the cylinder, an oil control ring spaced therefrom toward the skirt end of the cylinder, and intermediate rings therebetween, the improvement which comprises said cylinder having grooves in its wall extending longitudinally toward the head end of the piston to a position where they do not register with the compression ring but do register with the intermediate rings and oil control ring when the piston is in bottom dead center position, said grooves extending in the opposite direction through the full length of the cylinder to vent pressure from the area of the intermediate rings.

References Cited in the file of this patent

UNITED STATES PATENTS

| 754,121 | Brush | Mar. 8, 1904 |
| 1,295,329 | Kennedy | Feb. 25, 1919 |
| 1,459,819 | Bonner | June 26, 1923 |
| 1,744,514 | Thompson | Jan. 21, 1930 |
| 1,778,200 | Nibbs | Oct. 14, 1930 |
| 1,871,820 | Morton | Aug. 16, 1932 |

FOREIGN PATENTS

| 1,097,144 | France | Feb. 9, 1955 |